US008028327B1

(12) United States Patent
Talley et al.

(10) Patent No.: US 8,028,327 B1
(45) Date of Patent: Sep. 27, 2011

(54) METHOD AND SYSTEM FOR A LOW-COST-INTERNET-BASE STATION (LCIB) GRANTING A CLIENT DEVICE TEMPORARY ACCESS

(75) Inventors: Ryan S. Talley, Overland Park, KS (US); Bryan T. Barbee, Olathe, KS (US); Timothy W. Sill, Platte City, MO (US); Christopher Yenney, Ashbum, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 862 days.

(21) Appl. No.: 12/021,282

(22) Filed: Jan. 28, 2008

(51) Int. Cl.
*G06F 7/04* (2006.01)
*H04M 3/42* (2006.01)

(52) U.S. Cl. ....... 726/4; 726/3; 726/6; 726/29; 713/155; 370/401; 370/428; 370/338; 455/414.1; 455/426.1; 709/229

(58) Field of Classification Search .................. None
See application file for complete search history.

(56) References Cited

U.S. PATENT DOCUMENTS 5,794,142 A * 8/1998 Vanttila et al. ................ 455/419
5,845,203 A * 12/1998 LaDue ....................... 455/414.1
6,331,825 B1 * 12/2001 Ladner et al. ................ 340/988
6,584,097 B1 * 6/2003 Malik ........................... 370/352
7,079,836 B2 * 7/2006 Shi et al. ..................... 455/414.1
7,302,255 B1 * 11/2007 Lundy et al. ................ 455/414.1
2004/0203941 A1 * 10/2004 Kaplan et al. ................ 455/466
2005/0282544 A1 * 12/2005 Oommen et al. .......... 455/432.1
2006/0014520 A1 * 1/2006 Anderson et al. ............. 455/408
2007/0010245 A1 * 1/2007 Levitan ..................... 455/426.1
2007/0140275 A1 * 6/2007 Bowman et al. .............. 370/401
2007/0266246 A1 * 11/2007 Lee et al. ...................... 713/168

FOREIGN PATENT DOCUMENTS

EP 02075519.5 9/2002

* cited by examiner

*Primary Examiner* — Kaveh Abrishamkar (57) ABSTRACT

Methods and systems are provided for a low cost Internet base station (LCIB) to grant a client device temporary access to a wireless network. In an embodiment, an LCIB receives a request from a client device. The request includes a feature code, an access code, and a client-device identifier. The feature code in the request indicates that the client device is requesting temporary access to the wireless network. Upon detecting the feature code in the request, the LCIB compares the access code in the request with a stored access code. If the access code from the request matches the stored access code, the LCIB grants the client device access to the wireless network on a temporary basis. Alternatively, if the access code from the request does not match the stored access code, the LCIB denies the client device access to the wireless network.

20 Claims, 4 Drawing Sheets

METHOD AND SYSTEM FOR A LOW-COST-INTERNET-BASE STATION (LCIB) GRANTING A CLIENT DEVICE TEMPORARY ACCESS

BACKGROUND

1. Cellular Wireless Networks

Many people use mobile stations (i.e., client devices), such as cell phones and personal digital assistants (PDAs), to communicate with cellular wireless networks. These client devices and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a client device is positioned in one of these coverage areas, it can communicate over the air interface with the base station, and in turn over one or more circuit-switched and/or packet-switched signaling and/or transport networks to which the base station provides access. The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Client devices and macro base stations conduct communication sessions (e.g. voice calls and data sessions) over frequencies known as carriers, each of which may actually be a pair of frequencies, with the base station transmitting to the client device on one of the frequencies, and the client station transmitting to the base station on the other. This is known as frequency division duplex (FDD). The base-station-to-client-device link is known as the forward link, while the client-device-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a client device—that is on a given sector/carrier—to use a particular traffic channel for a communication session, the macro base station does so by instructing the client device to tune to one of the 61 traffic channels on that sector/carrier. It is over that assigned traffic channel that the macro base station will transmit forward-link data to the client device during the ensuing communication session. And, in addition to that forward-link channel, the traffic channel also includes a corresponding Walsh-coded reverse-link channel, over which the client device transmits data to the macro base station.

2. Low-Cost Internet Base Stations (LCIBs)

Many macro-network subscribers, including private consumers and small businesses, among others, in addition to having wireless service (which may include data service) for their client device (or client devices), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's client device(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that client devices can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

The present invention is directed to a low cost Internet base station (LCIB) or femtocell granting a client device temporary access to a wireless network. In an exemplary embodiment, the LCIB may be configured to receive a request for temporary access to the wireless network. As presently contemplated, the LCIB may be configured to receive a request that includes a feature code, an access code, and a client-device identifier.

The feature code in the request may indicate that the client device is requesting temporary access to the wireless network. The feature code, for example, may be a star code. The star code may include a star character ("*") followed by one or more digits. These digits may be any type of alphanumeric characters.

The access code may be a code unique to the LCIB. Instead or in addition, the access code may be a secret code. The access code may be used to prevent rogue client devices and/or unauthorized client devices from using the wireless network via the LCIB. The access code, for example, may be any type of code that includes one or more digits.

The client-device identifier in the received request may identify the device sending the request. As an example, the client-device identifier may be a mobile-identification number (MIN) of the client device sending the request.

Configuring the LCIB to receive and process this request may be carried out by a configuring system. As an example, the configuring system could be a computer system involved in configuring the LCIB to connect to the wireless network. As another example, the configuring system could be a client device such as PDA or cellular phone. As yet another example, the configuring system could include one or more network entities that could cooperate to provision the LCIB with an access code either over the air or through its backhaul connection.

Configuring the LCIB may take place at various times. As an example, the LCIB may be configured at the time of manufacture. As another example, the LCIB may be configured by an owner of the LCIB and/or a network administrator when the LCIB is being used for the first time. As yet another example, the LCIB may be configured when an owner of the LCIB and/or a network administrator wishes to configure the LCIB.

Further, configuring the LCIB may be triggered by the configuring system receiving a request to configure the LCIB with an access code. The request may originate from the owner of the LCIB or the network administrator operating the configuring system. As another example, the request may originate from a network device, which may be programmed to send a request to the configuring system.

The request to configure the LCIB may include an access code for the LCIB. The access code may be a code unique to the LCIB. Instead or in addition, the access code may be a secret code assigned by an operator. As noted above, the access code may be used to prevent rogue client devices and/or unauthorized client devices from using the wireless network via the LCIB. In addition to configuring the LCIB with an access code, the request to configure the LCIB may include a list of those client-device identifiers authorized to access the LCIB. Once the LCIB has been configured, a client device that is attempting to access to the LCIB may need to send to the LCIB the feature code, access code, and the client-device identifier. An owner of the LCIB and/or a network administrator of the LCIB may share the access code with a user of a client device. In one embodiment, the user may be a guest on or close to the owner's premises. In another embodiment, the user may be an employee on or close to the premises on which the LCIB is located. In yet another embodiment, the user may be a customer purchasing coffee and/or other goods at a particular venue. In this embodiment, the venue may have an LCIB situated on or close to the venue's premises. Many other embodiments are possible. The user may then use the access code to access the LCIB.

A request to access a wireless network including the feature code, the access code, and the client-device identifier (and/or any other codes) may be sent in several ways. In one embodiment, an LCIB may first prompt a client device attempting to connect to the LCIB to provide a feature code. A user may enter the feature code and the client device may then send the feature code to the LCIB. The LCIB may prompt the client device to provide the access code. The user may enter the access code and send it to the LCIB. The LCIB may then compare the access code in the request with a stored access code. If the access code from the request does not match the stored access code, the LCIB may deny the client device access to the wireless network. Alternatively, if the access code from the request matches the stored access code, the LCIB may prompt the client device to provide the client-device identifier and may grant the client device access to the wireless network.

In another embodiment, an LCIB receives a request from a client device. The request may include a feature code, an access code, and a client-device identifier. A user of the client device may enter the feature code, the access code, and the client-device identifier as a string of digits. The LCIB may parse the received request to identify the feature code, the access code, and the client-device identifier. Upon detecting the feature code in the request, the LCIB may compare the access code in the request with a stored access code. If the access code from the request does not match the stored access code, the LCIB denies the client device access to the wireless network. Alternatively, if the access code from the request matches the stored access code, the LCIB grants the client device access to the wireless network on a temporary basis.

There are many ways in which the LCIB may grant client device access to the wireless network on a temporary basis. In one embodiment, the LCIB may grant the client device access to the wireless network for a predefined period of time. The predefined period of time may be any length of time. As one example, the length of time may be 24 hours. As another example, the length of the time may be 10 minutes. And other examples abound.

In one embodiment, the LCIB may send a message to the client device before the time expires. The message may indicate the amount of time that remains before the LCIB disconnects the client device. Once the predefined period of time expires, the LCIB may disconnect the client device or deny the client device from any further access to the wireless network.

In the same embodiment or in another embodiment, the LCIB may grant the client device access to the wireless network for a predetermined number of communications. The predetermined number of communications may be the number of incoming calls, outgoing calls, all calls, data sessions, text messages, and/or anything else. And may other examples are possible.

As noted above, the request to access the wireless network may include the feature code, the access code, and the client-device identifier. It should be understood that the received request is not limited to just receiving these three codes. The request may include other codes instead or in addition. As an example, the request may include a duration code. In one embodiment, the duration code may indicate a length of time that the user would like to access the LCIB. In the same embodiment, the duration code may instead or in addition indicate a number of communications for which the user of the client device would like to access the LCIB.

If the requested duration (indicated by the duration code) exceeds the predefined period of time and/or predetermined number of communications (which may be set by a network administrator of the LCIB as an example), then the LCIB may grant the user's client device access to the LCIB as long as the access code in the request matches the stored access code, but the LCIB may limit the duration of the temporary access according to the predefined period of time and/or predetermined number of communications. In such a scenario, the LCIB may send a message to the user's client device, in which the message may indicate that (i) the LCIB has granted the client device access to the LCIB and/or (ii) the duration code was not accepted by the LCIB. Instead or in addition, the message may indicate that the duration of the temporary access has been limited to the predefined period of time and/or predetermined number of communications as set by the network administrator of the LCIB.

Alternatively, if requested duration (indicated by the duration code) is less than the predefined period of time and/or the predetermined number of communications, then the LCIB may grant the user's client device access to the LCIB as long as the access code in the request matches the stored access code, but the LCIB may limit the duration of the temporary access according to the requested duration. In the same embodiment or in a different embodiment, the LCIB may send a message to the user's client device indicating that the predefined period of time and/or the predetermined number of communications exceeds the requested duration. In such a scenario, the message may give the user an option to set the duration of temporary access to the predefined period of time and/or the predetermined number of communications. Instead or in addition, the message may give the user an option to set the duration of temporary access to any value that is less than or equal to the predefined period of time and/or the predetermined number of communications.

2. Exemplary Architecture a. An Exemplary Communication System

Figure 1:
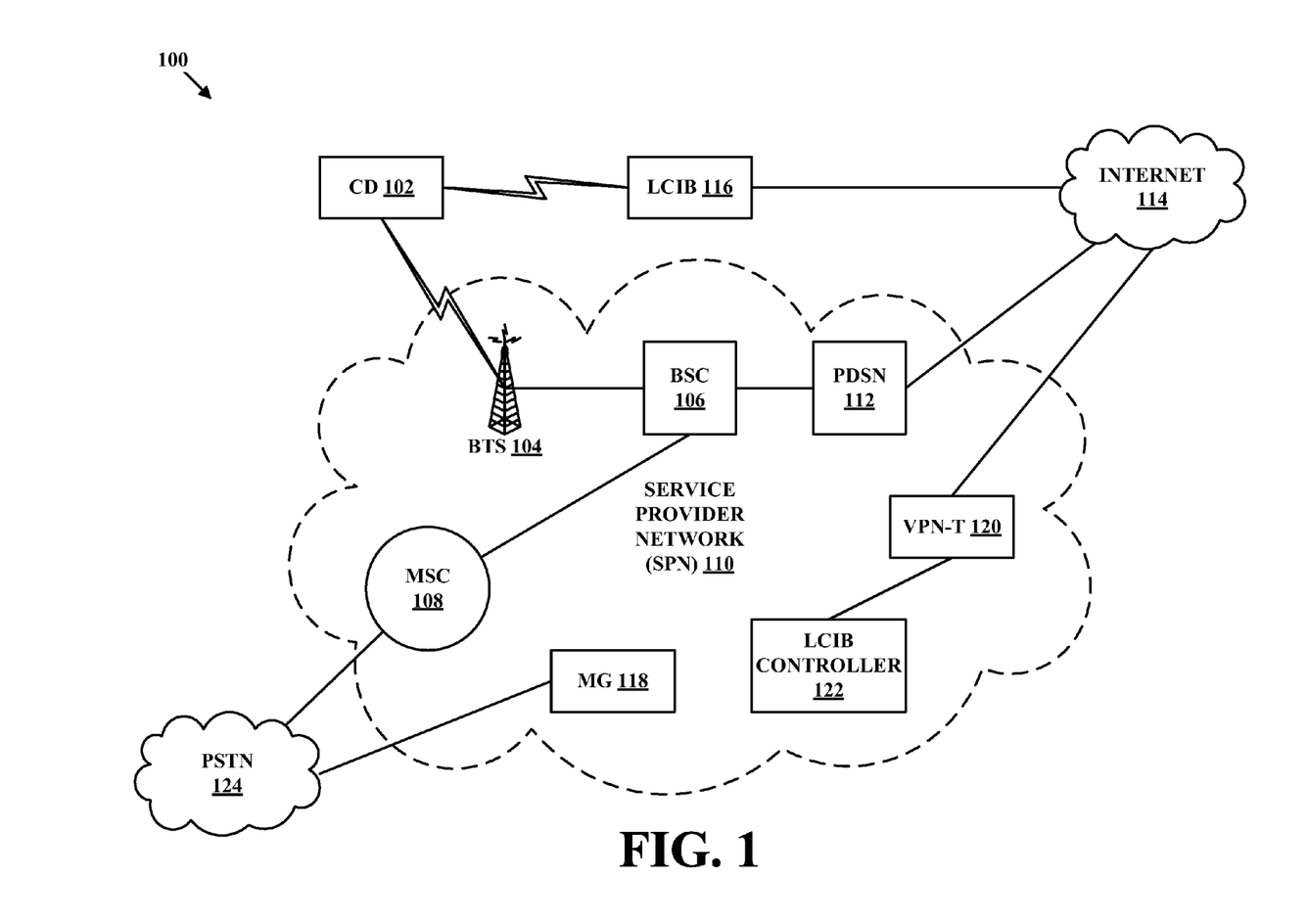
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a client device 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional client devices in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Client device 102 may be any client device arranged to carry out the client-device functions described herein. As such, client device 102 may include a user interface, a wireless-communication interface, a processor, and data storage comprising instructions executable by the processor for carrying out those client-device functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, client device 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with client devices such as client device 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between client devices and Internet 114, via macro base stations. Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more client devices according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
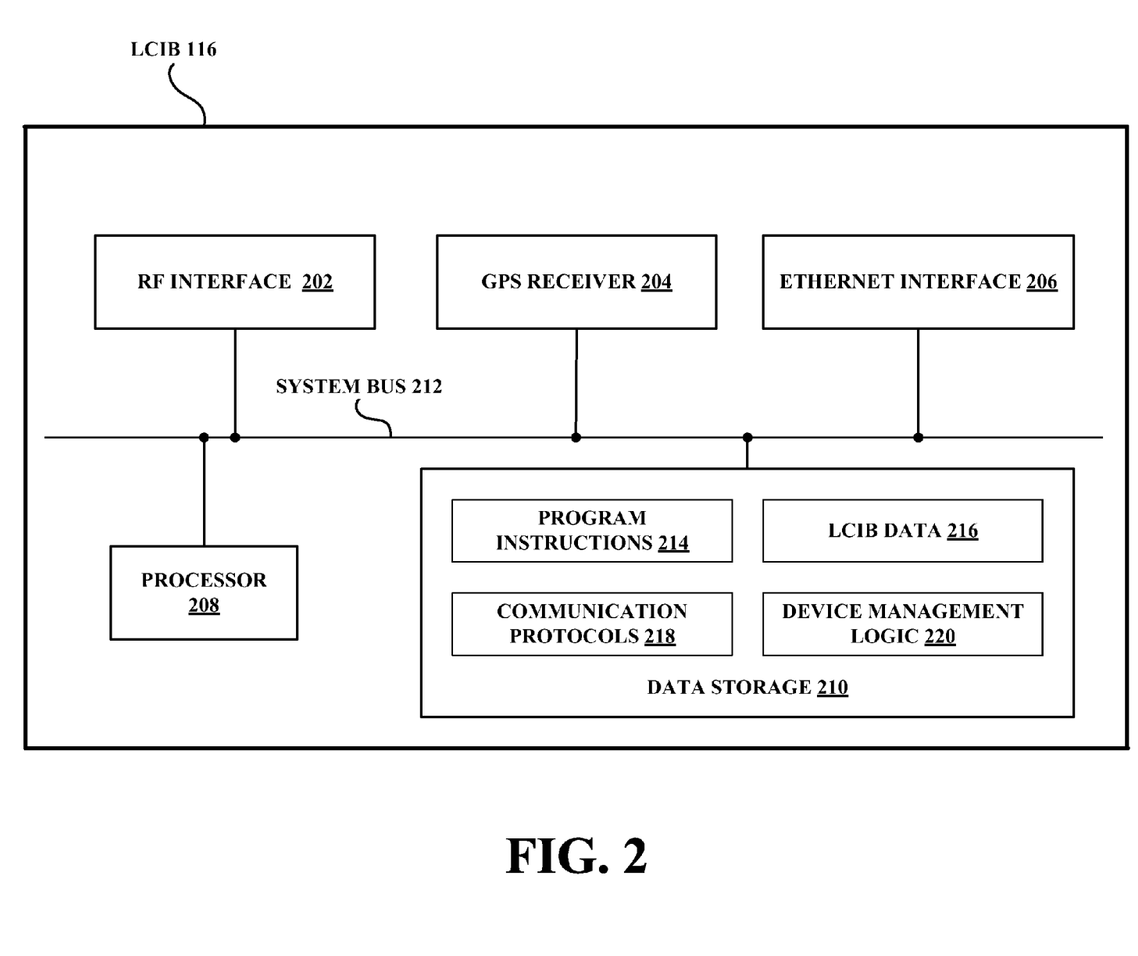
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). As an example, LCB 116 may provide a code division multiple access (CDMA) air interface (not shown). GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver. Further, in some embodiments, LCIB 116 may include a code division multiple access (CDMA) air interface (not shown).

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
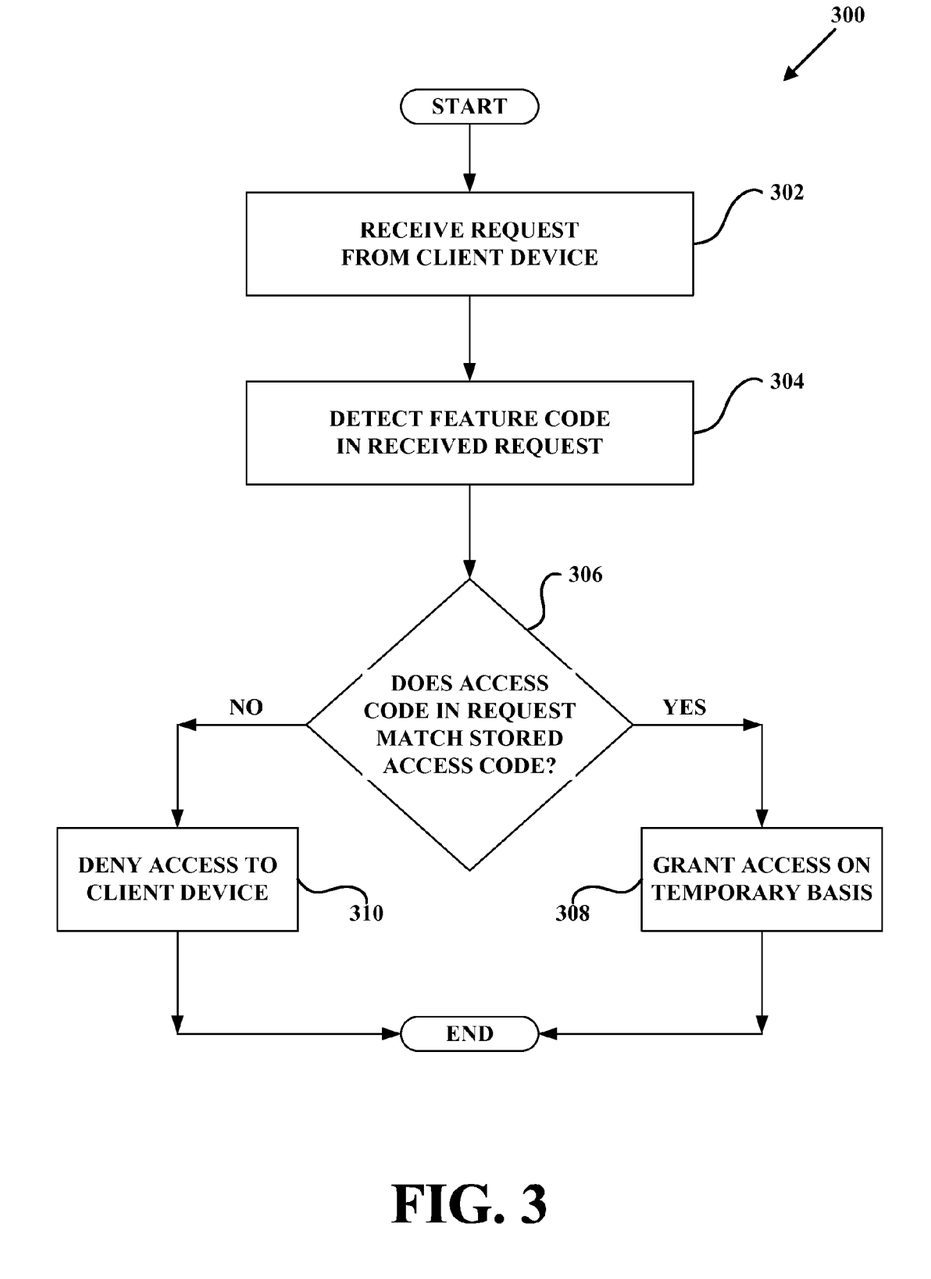
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 of granting client device 102 temporary access to LCIB 116 (and thus to SPN 110). As shown in FIG. 3, method 300 begins at step 302, when LCIB 116 receives a request from a client device 102. At step 304, LCIB 116 detects a feature code in the received request. At step 306, LCIB 116 determines whether an access code in the received request matches a stored access code. If the received access code matches the stored access code, then LCIB 116, at step 308, grants the client device 102 access to the LCIB 116 on a temporary basis. However, if the received access code does not match the stored access code, then LCIB 116, at step 310, denies client device 102 access to LCIB 116.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, and/or any other network element(s).

i. Receive Request from Client Device

At step 302, LCIB 116 receives a request from client device 102. As explained herein, LCIB 116 may communicate with client device 102 over a CDMA air interface, or over an air interface that operates according to any other wireless technology. The request received in step 302 may be a registration attempt and/or a connection attempt, where a connection attempt would be an attempt (i.e., request) to engage in a communication session, such as a voice call or data session.

The received request may include a feature code, an access code, and a client-device identifier. The feature code in the received request may indicate that client device 102 is requesting temporary access to LCIB 116. The feature code, for example, may be a star code. The star code may include a star character ("*") followed by one or more digits. These digits may be any type of alphanumeric characters.

The access code may be a unique code for LCIB 116 and may be used to prevent rogue client devices and/or unauthorized client devices from using LCIB 116. The access code, for example, may be any type of code that includes one or more digits. LCIB 116 may use the received access code to validate the received request. The validation process is explained below in connection with step 306, but as a general matter it should be understood that LCIB 116 grants access to only those devices that send the appropriate access code.

The client-device identifier in the received request may identify the device sending the request. As an example, the client-device identifier may be a mobile-identification number (MIN) of client device 102.

Below is an example of a feature code, an access code, and a client-device identifier.

Feature Code=*XYZ (e.g., *456)
Access Code=ABCD (e.g., 1234)
Client-device identifier=NPA-NXX-YYYY (e.g., 789-555-2222)

Client device 102 may arrange the three codes as a string of digits. For example, to illustrate, client device 102 may arrange the feature code, the access code, and the client-device identifier as follows: *XYZ1234NPANXXYYYY.

It should be understood that the received request is not limited to just receiving these three codes. The request may include other codes instead or in addition. As an example, the request may also include duration code. The duration code, for example, may be any type of code that includes one or more digits. In one embodiment, the duration code may indicate a length of time that the user would like to access the LCIB 116. In the same embodiment, the duration code may instead or in addition indicate a number of communications for which the user of the client device would like to access the LCIB 116. LCIB 116 may use the duration code to set how long and/or how many times client device 102 may access LCIB 116.

ii. Detect Feature Code in Received Request

At step 304, LCIB 116 detects the feature code in the received request. In one embodiment, LCIB 116 may detect the feature code by parsing the received request. In the same embodiment or in another embodiment, the star character ("*") in the feature code may function as a flag indicating that the string of digits that follow includes a feature code, as well as perhaps one or more additional data fields.

iii. Determine Whether Access Code in Received Request Matches Stored Access Code In response to detecting the feature code, LCIB 116, at step 306, validates the received request. In one embodiment, LCIB 116 may validate the received request by comparing the received access code with the stored code that has been stored in LCIB data 216. The stored access code may be a secret access code stored in LCIB data 216. Note that the stored access code could also or instead be stored on an accessible network entity, such as LCIB controller 122.

iv. Grant Temporary Access

If LCIB 116 determines that the received access code matches the stored access code, then LCIB 116, at step 108, grants client device 102 access to LCIB 116 (and thus to SPN 110) on a temporary basis. There are many ways in which LCIB 116 may grant client device 102 access to SPN 110 on a temporary basis.

In one embodiment, LCIB 116 may grant client device 102 access to SPN 110 for a predefined period of time. The predefined period of time may be any length of time. As one example, the length of time may be 24 hours.

Before the predefined period of time expires, LCIB 116 may send a message to client device 102 indicating the amount of time that remains. The user of client device 102 may choose to disconnect from LCIB 116. Once the predefined period of time expires, LCIB 116 may disconnect client device 102 or deny client device 102 from any further access to SPN 110. At this point in time, an operator of LCIB 116 may choose to reset the time limit allotted for client device 102.

In another embodiment, LCIB 116 may grant client device 102 access to SPN 110 for a predetermined number of communications. The predetermined number of communications may be the number of incoming calls, outgoing calls, all calls, data sessions, text messages, and/or anything else.

As noted above, the request, in some embodiments, may include a duration code. In one embodiment, the duration code may indicate a length of time that the user would like to access the LCIB 116. Instead or in addition, the duration code may indicate a number of communications for which the user of the client device would like to access LCIB 116.

If the requested duration (indicated by the duration code) exceeds the predefined period of time and/or predetermined number of communications (which may be set by a network administrator of LCIB 116 as an example), then LCIB 116 may grant client device 102 access to LCIB 116 as long as the access code in the request matches the stored access code, but LCIB 116 may limit the duration of the temporary access to the predefined period of time and/or predetermined number of communications. In such a scenario, LCIB 116 may send a message to client device 102, in which the message may indicate that (i) LCIB 116 has granted client device 102 access to LCIB 116 and/or (ii) the duration code was not accepted by LCIB 116. Instead or in addition, the message may indicate that the duration of temporary access has been limited to the predefined period of time and/or predetermined number of communications.

Alternatively, if requested duration (indicated by the duration code) is less than the predefined period of time and/or the predetermined number of communications, then LCIB 116 may grant client device 102 access to LCIB 116 as long as the access code in the request matches the stored access code, but LCIB 116 may limit the duration of the temporary access to the requested duration. In the same embodiment or in a different embodiment, LCIB 116 may send a message to client device 102 indicating that the predefined period of time and/or the predetermined number of communications exceeds the requested duration. In such a scenario, the message may give the user an option to set the duration of temporary access to the predefined period of time and/or the predetermined number of communications. Instead or in addition, the message may give the user an option to set the duration of temporary access to any value less than or equal to the predefined period of time and/or the predetermined number of communications.

v. Deny Access

Alternatively, if LCIB 116 determines that the received access code does not match the stored access code, then LCIB 116, at step 310, denies client device 102 access. In one embodiment, LCIB 116 may send an error message to client device 102 indicating that the access code used by client device 102 is incorrect.

In the same embodiment or in a different embodiment, when denying access to client device 102, LCIB 116 may send a message to the operator of LCIB 116. The message may provide the time at which the request was denied and the client-device identifier of client device 102. The message may be sent as a text message to the operator's client device. In addition, or alternatively, the message may be sent as an email message to the operator's email account. And many other examples are possible as well.

b. A Second Exemplary Method

Figure 4:
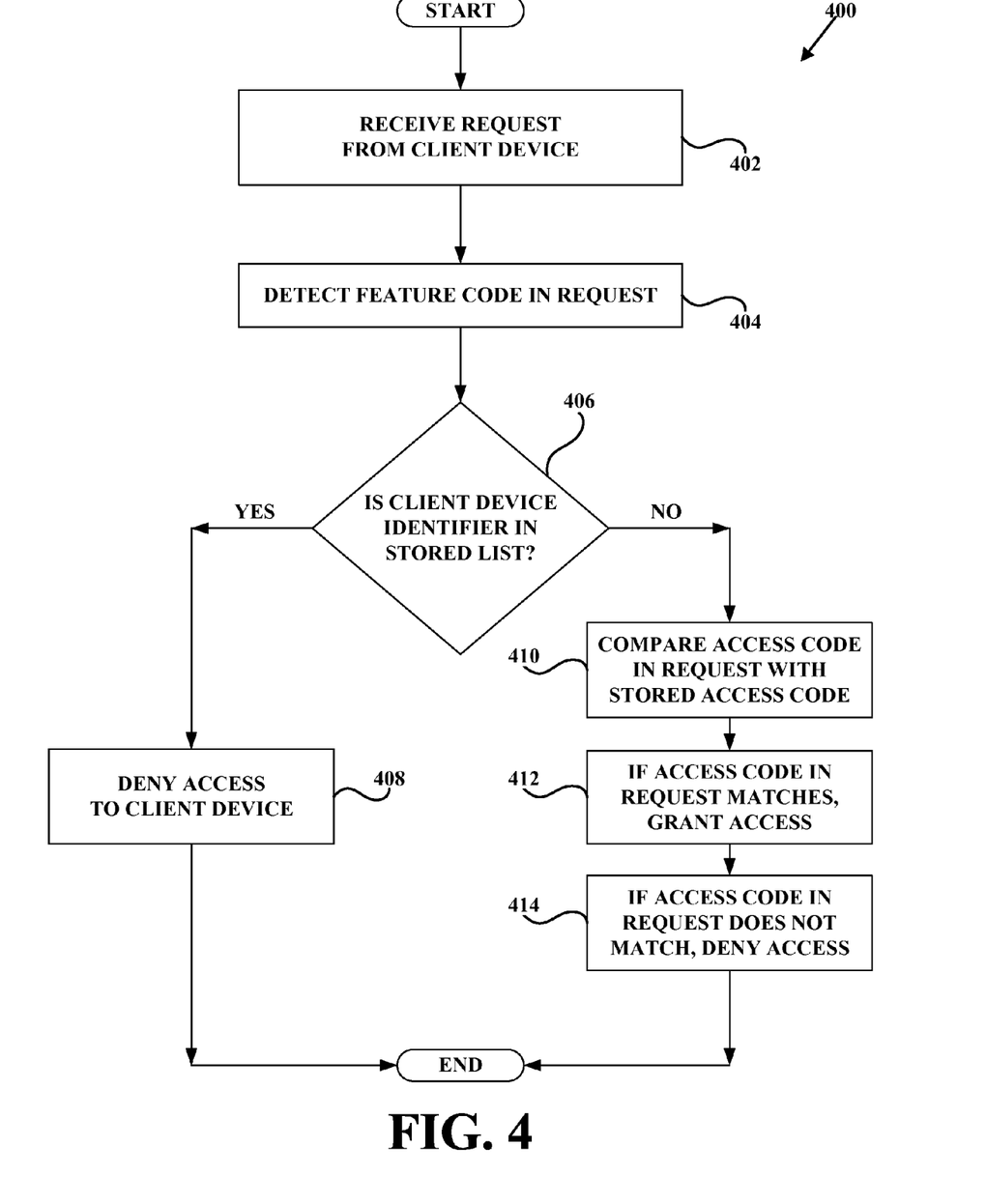
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB, such as LCIB 116, or perhaps by an LCIB in cooperation with one or more other entities, such as VPN terminator 120 and/or LCIB controller 122. Method 400 is similar in some respects to method 300, and thus is not described in as great of detail.

As shown in FIG. 4, method 400 begins at step 402, when LCIB 116 receives a request from a client device 102. At step 404, LCIB 116 detects a feature code in the received request. At step 406, LCIB 116 makes a determination of whether a client-device identifier is in a stored list. As an example, LCIB 116 may make this determination by comparing the MIN identified in the request with a list of MINs identified in the stored list. In this example, the stored list is a list of client devices that are blocked from accessing LCIB 116 whether they have the right access code or not.

If the determination is that client-device identifier is not in the stored (i.e., blocked) list, then LCIB 116 determines whether access code in the received request matches a stored access code at step 410. Steps 410, 412, and 414 are similar to the steps 306, 308, and 310 of FIG. 3. If the received access code matches the stored access code, then LCIB 116, at step 412, grants the client device 102 access on a temporary basis. However, if the received access code does not match the access code stored in LCIB 116, then LCIB 116, at step 414, denies access to client device 102.

Alternatively, if the determination (at step 406) is that the client-device identifier is on the stored (i.e., blocked) list, then LCIB 116 denies client device 102 access without even checking the access code.

4. Conclusion

Various exemplary embodiments have been described above. Those skilled in the art will understand, however, that changes and modifications may be made to those examples without departing from the scope of the claims.

The invention claimed is:

1. A method of granting temporary access to a wireless network, carried out by a low-cost Internet base station (LCIB) having a coverage area, the method comprising:

the LCIB receiving from a client device over an air interface a leading feature-code indicator that was input via a user interface of the client device, followed by a feature code indicating that the client device is requesting temporary access to the wireless network, the feature code also having been input via the user interface of the client device;

the LCIB also receiving from the client device over the air interface an access code that was input via the user interface of the client device;

the LCIB, responsive to receiving the leading feature-code indicator, the feature code, and the access code, comparing the received access code with a stored access code;

the LCIB, if the received access code matches the stored access code, granting the client device access to the wireless network on a temporary basis; and the LCIB, if the received access code does not match the stored access code, denying the client device access to the wireless network.

2. The method of claim 1, wherein the air interface is a code division multiple access (CDMA) air interface.

3. The method of claim 1, wherein the feature code comprises a star code, and wherein the feature-code indicator is a star character.

4. The method of claim 3, wherein the access code comprises one or more digits.

5. The method of claim 4, further comprising the LCIB receiving from the client device over the air interface a client-device identifier that identifies the client device, wherein the client-device identifier comprises a mobile identification number of the client device.

6. The method of claim 5, further comprising the LCIB parsing a single request received from the client device over the air interface to identify the feature code, the access code, and the client-device identifier in the request.

7. The method of claim 1, wherein the stored access code comprises one or more digits.

8. The method of claim 1, further comprising receiving and storing the stored access code.

9. The method of claim 1, wherein granting the client device access to the wireless network on a temporary basis comprises granting the client device access to the wireless network for a predefined period of time.

10. The method of claim 9, wherein the predefined period of time is 24 hours.

11. The method of claim 1, wherein granting the client device access to the wireless network on a temporary basis comprises granting the client device access to the wireless network for a predetermined number of communications.

12. A low-cost Internet base station (LCIB) having a coverage area, the LCIB comprising:
- a communication interface;
- a processor; and
- data storage comprising instructions executable by the processor for:
  - receiving from a client device over an air interface a leading feature-code indicator that was input via a user interface of the client device, followed by a feature code indicating that the client device is requesting temporary access to the wireless network, the feature code also having been input via the user interface of the client device;
  - receiving from the client device over the air interface an access code that was also input via the user interface of the client device;
  - responsive to receiving the leading feature-code indicator, the feature code, and the access code, comparing the received access code with a stored access code;
  - if the received access code matches the stored access code, granting the client device access to the wireless network on a temporary basis; and
  - if the received access code does not match the stored access code, denying the client device access to the wireless network.

13. The LCIB of claim 12, wherein the air interface is a code division multiple access (CDMA) air interface.

14. The LCIB of claim 12, wherein the feature code comprises a star code, the feature-code indicator being a star character, wherein the access code comprises one or more digits, wherein the LCIB also receives from the client device over the air interface a client-device identifier that identifies the client device, and wherein the client-device identifier comprises a mobile identification number of the client device.

15. The LCIB of claim 14, wherein the data storage further comprises instructions executable by the processor for parsing a single request received from the client device over the air interface to identify the feature code, the access code, and the client-device identifier in the request.

16. The LCIB of claim 12, wherein the data storage further comprises instructions executable by the processor for receiving and storing the stored access code.

17. The LCIB of claim 12, wherein the instructions executable by the processor for granting the client device access to the wireless network on a temporary basis comprise instructions for granting the client device access to the wireless network for a predefined period of time.

18. The LCIB of claim 17, wherein the predefined period of time is 24 hours.

19. The LCIB of claim 12, wherein the instructions for granting the client device access to the wireless network on a temporary basis comprise instructions for granting the client device access to the wireless network for a predetermined number of communications.

20. A method of granting temporary access to a wireless network, carried out by a low-cost Internet base station (LCIB) having a coverage area, the method comprising:
- the LCIB receiving a request over an air interface from a client device, the request comprising a leading feature-code indicator, a feature code, an access code, and a client-device identifier, the feature code indicating that the client device is requesting temporary access to the wireless network, wherein each of the feature-code indicator, the feature code, and the access code were input via a user interface of the client device;
- the LCIB detecting the feature code in the request, and responsively checking whether the client-device identifier is in a stored list of blocked client-device identifiers, the stored list consisting of client-device identifiers for any client devices that have met their limit for temporary access to the wireless network, as well as for any client devices that are otherwise unauthorized;
- the LCIB, if the client-device identifier from the request is in the stored list, then denying the client device access to the wireless network; and
- the LCIB, if the client-device identifier from the request is not in the stored list, then:
  - (i) comparing the access code from the request with a stored access code;
  - (ii) if the access code from the request matches the stored access code, granting the client device access to the wireless network on a temporary basis; and
  - (iii) if the access code from the request does not match the stored access code, denying the client device access to the wireless network.

* * * * *